(12) United States Patent
Roberts et al.

(10) Patent No.: US 8,885,999 B2
(45) Date of Patent: Nov. 11, 2014

(54) OPTICAL USB CABLE WITH CONTROLLED FIBER POSITIONING

(75) Inventors: Reginald Roberts, Taylorsville, NC (US); James A. Register, III, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 467 days.

(21) Appl. No.: 13/049,394

(22) Filed: Mar. 16, 2011

(65) Prior Publication Data

US 2011/0229097 A1   Sep. 22, 2011

Related U.S. Application Data

(60) Provisional application No. 61/315,492, filed on Mar. 19, 2010.

(51) Int. Cl.
*G02B 6/44* (2006.01)

(52) U.S. Cl.
CPC ............ *G02B 6/4416* (2013.01); *G02B 6/4407* (2013.01)
USPC ......................................... 385/101; 385/114

(58) Field of Classification Search
USPC .......... 385/100–102, 104–106, 110–112, 114
See application file for complete search history.

(56) References Cited

U.S. PATENT DOCUMENTS

| | | | |
|---|---|---|---|
| 3,865,466 A * | 2/1975 | Slaughter | 385/103 |
| 4,038,489 A | 7/1977 | Stenson et al. | |
| 4,172,106 A | 10/1979 | Lewis | |
| 4,358,634 A * | 11/1982 | Dienes | 174/88 R |
| 4,491,387 A * | 1/1985 | Dey et al. | 385/113 |
| 4,525,702 A | 6/1985 | Kitagawa et al. | 340/556 |
| 4,984,869 A | 1/1991 | Roche | |
| 5,050,957 A | 9/1991 | Hamilton et al. | |
| 5,132,488 A * | 7/1992 | Tessier et al. | 174/34 |
| 5,138,685 A | 8/1992 | Arroyo et al. | |
| 5,163,116 A | 11/1992 | Oestreich et al. | 385/111 |
| 5,319,730 A | 6/1994 | Räsänen et al. | 385/114 |
| 5,329,606 A * | 7/1994 | Andreassen | 385/109 |
| 5,469,523 A | 11/1995 | Blew et al. | 385/101 |
| 5,509,097 A | 4/1996 | Tondi-Resta et al. | |
| 5,542,020 A | 7/1996 | Horska | |
| 5,590,233 A * | 12/1996 | Carratt et al. | 385/100 |

(Continued)

FOREIGN PATENT DOCUMENTS

| | | | |
|---|---|---|---|
| AU | 740507 B2 | 2/1999 | |
| DE | 2928678 A1 | 1/1981 | G02B 5/16 |

(Continued)

OTHER PUBLICATIONS

Raymer et al., "Spontaneous Knotting of an agitated string," PNAS, vol. 104, No. 42, The National Academy of Sciences of the USA, Oct. 16, 2007, pp. 16432-16437.

(Continued)

*Primary Examiner* — Rhonda Peace
(74) *Attorney, Agent, or Firm* — Russell S. Magaziner

(57) ABSTRACT

Methods of controlling the position of an optical fiber having a minimum bend radius within an optical fiber channel in a fiber optic cable having a small footprint are disclosed. The position of the optical fibers is controlled so that the fiber is not bent at a radius below its minimum bend radius.

20 Claims, 5 Drawing Sheets

(56) References Cited

U.S. PATENT DOCUMENTS

| | | | |
|---|---|---|---|
| 5,636,308 A * | 6/1997 | Personne et al. | 385/102 |
| 5,651,081 A | 7/1997 | Blew et al. | 385/101 |
| 5,668,912 A | 9/1997 | Keller | 385/100 |
| 5,740,295 A | 4/1998 | Kinard et al. | |
| 5,748,820 A * | 5/1998 | Le Marer et al. | 385/76 |
| 5,902,958 A * | 5/1999 | Haxton | 174/47 |
| 5,960,144 A | 9/1999 | Klumps et al. | 385/113 |
| 5,970,196 A | 10/1999 | Greveling et al. | |
| 5,999,676 A | 12/1999 | Hwang | |
| 6,041,153 A | 3/2000 | Yang | |
| 6,137,935 A | 10/2000 | Bohme et al. | |
| 6,141,472 A | 10/2000 | Ishikawa et al. | |
| 6,198,865 B1 | 3/2001 | Risch | |
| 6,205,277 B1 * | 3/2001 | Mathis et al. | 385/106 |
| 6,233,384 B1 | 5/2001 | Sowell, III et al. | 385/107 |
| 6,241,920 B1 | 6/2001 | Cotter et al. | |
| 6,249,629 B1 | 6/2001 | Bringuier | |
| 6,303,867 B1 * | 10/2001 | Clark et al. | 174/113 R |
| 6,314,224 B1 | 11/2001 | Stevens et al. | |
| 6,343,172 B1 | 1/2002 | Schiestle et al. | 385/101 |
| 6,377,738 B1 | 4/2002 | Anderson et al. | |
| 6,430,344 B1 | 8/2002 | Dixon et al. | |
| 6,434,304 B2 | 8/2002 | Gao et al. | |
| 6,519,396 B2 | 2/2003 | Schneider et al. | 385/101 |
| 6,618,526 B2 | 9/2003 | Jackman et al. | 385/102 |
| 6,687,437 B1 | 2/2004 | Starnes et al. | 385/101 |
| 6,738,547 B2 | 5/2004 | Spooner | 385/101 |
| 6,785,452 B2 | 8/2004 | Yasutomi | 385/102 |
| 6,874,947 B2 * | 4/2005 | Minegishi et al. | 385/78 |
| 6,912,347 B2 * | 6/2005 | Rossi et al. | 385/112 |
| 7,113,680 B2 | 9/2006 | Hurley et al. | 385/113 |
| 7,123,801 B2 * | 10/2006 | Fitz | 385/105 |
| 7,127,144 B2 | 10/2006 | Lee | 385/101 |
| 7,289,704 B1 | 10/2007 | Wagman et al. | 385/100 |
| 7,324,730 B2 * | 1/2008 | Varkey et al. | 385/102 |
| 7,397,990 B2 * | 7/2008 | Brown et al. | 385/101 |
| 7,406,233 B2 * | 7/2008 | Seddon et al. | 385/114 |
| 7,421,169 B2 * | 9/2008 | Honjo et al. | 385/100 |
| 7,627,218 B2 | 12/2009 | Hurley | 385/101 |
| 7,643,713 B2 | 1/2010 | Büthe et al. | 385/101 |
| 7,778,510 B2 | 8/2010 | Aronson et al. | 385/101 |
| 7,787,727 B2 | 8/2010 | Bringuier et al. | 385/113 |
| 7,860,362 B2 * | 12/2010 | Varkey et al. | 385/105 |
| 7,920,764 B2 | 4/2011 | Kewitsch | 385/101 |
| 8,374,471 B2 * | 2/2013 | Griffioen | 385/100 |
| 8,403,571 B2 * | 3/2013 | Walker | 385/88 |
| 8,655,127 B2 * | 2/2014 | Leonard et al. | 385/106 |
| 8,693,831 B2 * | 4/2014 | Register et al. | 385/113 |
| 2002/0041743 A1 | 4/2002 | Schneider et al. | |
| 2002/0088906 A1 * | 7/2002 | Nothofer et al. | 248/65 |
| 2002/0126967 A1 | 9/2002 | Panak et al. | |
| 2002/0141713 A1 | 10/2002 | Okada et al. | |
| 2002/0159727 A1 | 10/2002 | Okada et al. | |
| 2003/0023247 A1 | 1/2003 | Lind et al. | |
| 2003/0072545 A1 | 4/2003 | Kusakari et al. | 385/101 |
| 2003/0118298 A1 | 6/2003 | Matsuyama et al. | |
| 2003/0165310 A1 | 9/2003 | Moon et al. | |
| 2003/0235379 A1 | 12/2003 | Lin | 385/101 |
| 2004/0057681 A1 | 3/2004 | Quinn et al. | 385/110 |
| 2004/0096167 A1 * | 5/2004 | Rossi et al. | 385/112 |
| 2005/0017495 A1 | 1/2005 | Arnold | |
| 2005/0271337 A1 * | 12/2005 | Park et al. | 385/113 |
| 2006/0088251 A1 | 4/2006 | Wang et al. | 385/88 |
| 2006/0104579 A1 * | 5/2006 | Fitz | 385/103 |
| 2006/0140556 A1 * | 6/2006 | Brown et al. | 385/100 |
| 2006/0291787 A1 | 12/2006 | Seddon | |
| 2008/0037941 A1 | 2/2008 | Mallya et al. | 385/101 |
| 2008/0037942 A1 | 2/2008 | Tatat | 385/113 |
| 2008/0118211 A1 | 5/2008 | Seddon et al. | 385/114 |
| 2010/0008631 A1 | 1/2010 | Herbst | 385/101 |
| 2010/0189396 A1 * | 7/2010 | Hashimoto et al. | 385/112 |
| 2010/0209058 A1 * | 8/2010 | Ott | 385/101 |
| 2010/0316340 A1 | 12/2010 | Sales Casals et al. | 385/101 |
| 2010/0329614 A1 | 12/2010 | Keller et al. | 385/101 |
| 2011/0083898 A1 | 4/2011 | Miller, III | |
| 2011/0217010 A1 * | 9/2011 | Kachmar | 385/111 |
| 2011/0229097 A1 * | 9/2011 | Roberts et al. | 385/101 |
| 2012/0301090 A1 | 11/2012 | Cline et al. | |
| 2012/0315004 A1 | 12/2012 | Register et al. | |
| 2012/0328253 A1 | 12/2012 | Hurley et al. | |
| 2013/0188916 A1 | 7/2013 | Bradley et al. | |

FOREIGN PATENT DOCUMENTS

| | | | | |
|---|---|---|---|---|
| DE | 19628457 A1 | 1/1998 | | |
| DE | 29716946 U1 | 1/1999 | | |
| EP | 0676654 A2 | 10/1995 | | |
| EP | 0945876 A1 | 9/1999 | | |
| EP | 0767754 B1 | 7/2000 | | |
| EP | 1061394 B1 | 11/2009 | | G02B 6/44 |
| FR | 2555764 A1 | 5/1985 | | |
| GB | 2123164 A | 1/1984 | | G02B 5/14 |
| GB | 2233788 A | 1/1991 | | |
| JP | 0320704 A | 1/1991 | | |
| JP | 0352529 A | 3/1991 | | |
| JP | 07174949 A | 7/1995 | | |
| JP | 09152529 A | 6/1997 | | |
| JP | 11160594 A | 6/1999 | | |
| JP | 2000276955 A | 10/2000 | | |
| WO | 0198810 A1 | 12/2001 | | |

OTHER PUBLICATIONS

Notice of Allowance for U.S. Appl. 13/559,102 mailed Sep. 27, 2013, 10 pages.

U.S. Appl. No. 13/596,256, filed Aug. 28, 2012, 38 pages.

European Patent Office, European Search Report, Application No. 11158852.1, Mail date Oct. 28, 2013—10 pages.

* cited by examiner

OPTICAL USB CABLE WITH CONTROLLED FIBER POSITIONING

PRIORITY APPLICATION

This application claims the benefit of U.S. Provisional Application 61/315,492, filed Mar. 19, 2010, the entire contents of which are incorporated by reference.

BACKGROUND

1. Technical Field

The present disclosure generally relates to fiber optic cables and methods of controlling a position of an optical fiber within the fiber optic cable.

2. Technical Background

As the use of fiber optics migrates into numerous consumer electronics applications, such as connecting computer peripherals, there will be a consumer-driven expectation for cables having improved performance and a broad range of use. For example, it is likely that consumer demand will be for a fiber optic cable having a small footprint (e.g. a cable outer diameter less than 3.0 millimeters (mm)) while at the same being flexible enough to "bend back" upon itself.

However, optical performance and optical fiber integrity are adversely affected by cable "bend back." FIG. 1 shows a typical fiber optic cable in a bent back configuration. The fiber optic cable 2 is generally circular and has an outer bend periphery 16 and a cable diameter or thickness 6. Internal to the cable is an optical fiber 10, which carries data. When the fiber optic cable 2 is bent back as shown, a bend radius 8 is at a minimum and is approximately equal to the cable diameter 6. The location of the optical fiber 10 within the cable 2 will affect a bend radius 12 of the optical fiber 10. If the optical fiber 10 is close to the outer bend periphery 16, the fiber will have a larger bend radius and experience lower attenuation. If the optical fiber 10 is closer to the inner portion of the cable, the bend radius of the fiber will be smaller and cause greater delta attenuation due bending. If the bend radius 12 is small enough, the optical fiber may crack at an outer surface 18 of the optical fiber 10 and cause cracking or fracture of the optical fiber 10.

SUMMARY

According to a first embodiment, a fiber optic cable comprises a polymer jacket having a channel therein, the channel having a first slot, at least one optical fiber in the first slot, a first electrical conductor, and a second electrical conductor. The optical fiber is positioned in the first slot and remains within the first slot when the fiber optic cable is bent a maximum amount such that a bend radius of the optical fiber is greater than or equal to a minimum bend radius of the optical fiber. The cable may have first and second preferential bend axes such that when the cable is bent back about either axis, the optical fibers are bent at bend radii exceeding their minimum bend radii. The cable can have a round cross-section with a diameter in the range of 2.8-3.2 millimeters, and the geometric center of the first slot can be within 0.2 millimeters of the geometric center of the cable.

According to a second embodiment, a fiber optic cable comprises a polymer jacket having a channel therein, at least one optical fiber in the channel, a first electrical conductor on a first side of the channel, and a second electrical conductor on a second side of the channel. The optical fiber is positioned in the channel and remains within the channel when the fiber optic cable is bent a maximum amount such that a bend radius of the optical fiber is greater than or equal to a minimum bend radius of the optical fiber. The cable may have a preferential bend axis aligned with the channel such that when the cable is bent back about the channel, the optical fibers are bent at bend radii exceeding their minimum bend radii. The cable can have a round cross-section with a diameter in the range of 2.8-3.2 millimeters, and the geometric center of the channel can be within 0.2 millimeters of the geometric center of the cable.

According to a third embodiment, a fiber optic cable comprises a polymer jacket having a channel therein and a diameter in the range of 2.8-3.2 millimeters, the channel having a width at least twice as large as a height of the channel, at least one optical fiber in the channel, and a strength material disposed within the channel and contacting the at least one optical fiber. The optical fiber is positioned in the channel and remains within the channel when the fiber optic cable is bent a maximum amount such that a bend radius of the optical fiber is greater than or equal to a minimum bend radius of the optical fiber. The geometric center of the channel can be within 0.2 millimeters of the geometric center of the cable.

BRIEF DESCRIPTION OF THE DRAWINGS

The components of the following figures are illustrated to emphasize the general principles of the present disclosure and are not necessarily drawn to scale. Reference characters designating corresponding components are repeated as necessary throughout the figures for the sake of consistency and clarity.

DETAILED DESCRIPTION

Some aspects of the present disclosure are directed to fiber optic cables containing an optical fiber, and methods of controlling the position of the optical fiber within the fiber optic cables. According to various embodiments, the fiber optic cables described herein may include a plurality of optical fibers arranged with little or no stranding or twisting around each other.

Figure 1:
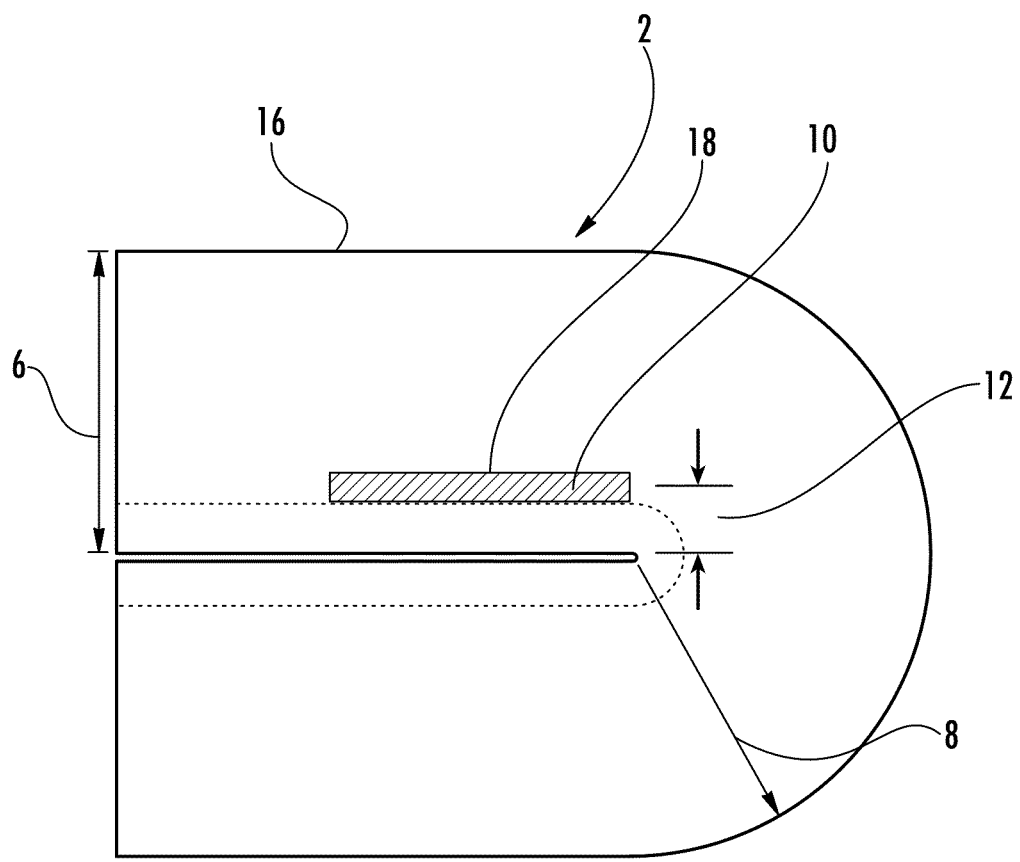
FIG. 1 is a cross-sectional view of a typical prior art fiber optic cable in a bent back configuration, wherein the cross-section is parallel to a length of the cable.
Figure 2:
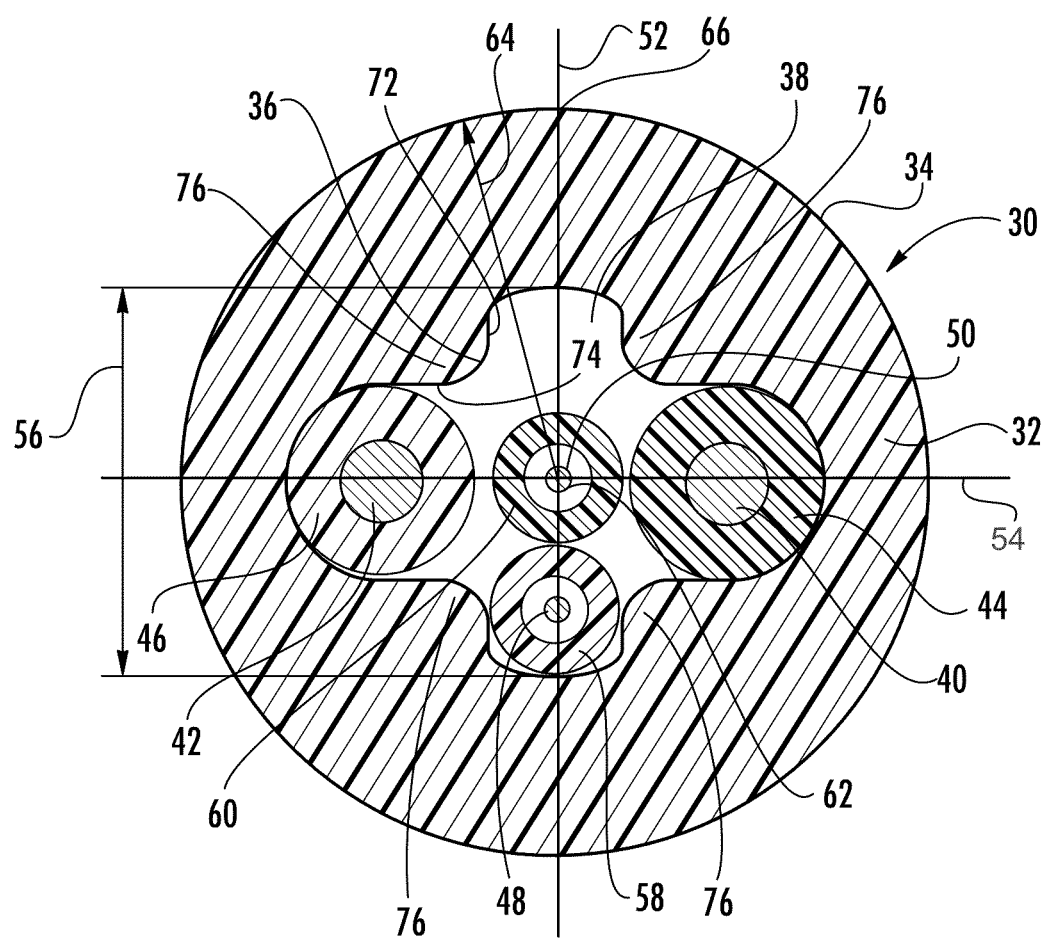
FIG. 2 is a cross-sectional view of a fiber optic cable according to an embodiment of this disclosure, wherein the cross-section is a transverse cross-section perpendicular to a length of the cable.

FIG. 2 is a cross-sectional view of a fiber optic cable 30 according to a first embodiment of this disclosure. The cable 30 includes a polymer jacket 32 having an outer periphery 34 and a channel periphery 36 with the channel periphery 36 defining a channel 38. In the illustrated embodiment, the cross-section of the cable 30 is generally circular with a diameter of about 3.0 millimeters (mm). In this specification, it is understood that circular cables may have somewhat irregular cross-sections and varying degrees of ovality.

Accordingly, references to diameters and radii of circular cables refer to median or average values. In this specification, the terms "polymer" and "polymeric" indicate materials comprised primarily of polymers, but allow for the inclusion of non-polymer additives and other materials, such as fire-retardant compounds, etc., and the inclusion of multiple polymers in a blend.

The polymer jacket 32 encloses the channel 38 and the channel 38 may extend the entire length of the cable 30. The cable 30 further includes a pair of metallic electrical conductors 40, 42 that supply power to peripheral electrical equipment. The electrical conductors 40, 42 can in addition or alternatively carry data. The electrical conductors 40, 42 may be surrounded by insulating material 44, 46 respectively. Alternatively, the electrical conductors 40, 42 can be embedded in the jacket 32 so that insulating material can be omitted. Data-carrying optical fibers 48, 50 are also included within the cable 30. The optical fibers 48, 50 may be surrounded by buffer layers 58, 60, respectively. The electrical conductors 40, 42 and the buffered optical fibers 48, 50 are positioned within the channel 38. Additional conductors can be wholly or partially embedded within the jacket 32. The optical fibers 48, 50 are generally allowed to translate within the channel 38 when the cable 30 is bent.

In FIG. 2, the optical fibers 48, 50 can translate in the channel 38 along a first axis 52 that is perpendicular to a first axis 54 along which the electrical conductors 40, 42 are generally aligned. The channel 38 has a "height" or length dimension 56 along the axis 52 through which the fibers can translate. In the exemplary embodiment, the channel 38 is "cross" or "T" shaped, and the cable 30 has a geometric center 62 generally located at the intersection of the axes 52, 54. The optical fibers 40, 42 are arranged in a first slot 72, which is aligned with the axis 52, and the electrical conductors 40, 42 are arranged in a second slot 74, which is aligned with the axis 54. The slots 72, 74 are defined in part by four projections 76 that extend radially inward into the channel 38. The projections 76 may have the form of rounded corners.

The shape of the slots 72, 74 and the location of the electrical conductors 40, 42 provide some degree of a preferential bend characteristic to the cable 30 to bend either about the axis 52 or the axis 54, as well as allowing the optical fibers 48, 50 to translate to locations to increase their bend radius and reduce optical attenuation. Regarding preferential bend, the shape of the channel 38 minimizes the material moments of inertia about the axis 54, and accordingly generally induces the cable 30 to bend about axis 54 when the cable 30 is subjected to bending moments. If the cable 30 is bent back about the axis 54, the optical fibers 48, 50 will undergo a bend radius approximately equal to or greater than the cable radius 64. According to one aspect of the present invention, the optical fibers can be selected so that when the cable is bent back about the axis 54, which is aligned with the slot 72, the optical fibers do not experience undue optical attenuation. For example, in the exemplary embodiment, the optical fibers 48, 50 may have a minimum bend radius of about 1.5 mm that results in an acceptable delta attenuation in the range of about 1.5 dB to 2.0 dB. The exemplary cable radius 64, corresponding to the bend back radius, is about 1.5 mm, so that the optical fibers 48, 50 are not bent at a radius smaller than their minimum bend radius when bending about axis 54.

If the cable 30 is bent in its preferred mode, about the axis 54, the optical fibers are allowed to translate in the slot 72 so that the fibers 48, 50 do not bend at a radius below their minimum bend radius. For example, if the cable 30 is bent back about axis 54 so that a location 66 on the cable 30 is where the cable is bent back upon itself, the optical fibers will translate "downwardly" in the slot 72, away from the bend back location 66, to the orientation shown in FIG. 2. The optical fiber 48 will move away from location 66, toward the "bottom" of the slot 72, where the fiber 48 is at its lowest strain state. The optical fiber 50 will also move away from the bend back location 66 toward a state of low strain. The height 56 of the slot 72 is selected so that optical fibers in the slot do not bend at a radius below their minimum bend radius. For example, the height 56 of the slot 72 in the exemplary embodiment is about 1.5 mm, so that when the cable 30 is in bend back, the optical fiber closest to the bend back location is bent at a radius of at least 1.5 mm.

According to the above embodiment, the preferential bend characteristic of the cable 30 prevents the optical fibers 48, 50 in the cable 30 from bending below their minimum bend radii. The electrical conductors 40, 42 are constrained within the slot 74 to prevent crossover with the optical fibers 48, 50, which reduces the likelihood of the fibers from moving out of their slot 72. A geometric center of the slot 72 can correspond to the geometric center 62 of the cable 30, which can have a round cross-section, or the geometric center of the slot 72 can be within 0.2 mm of the center of the cable 30. Although the illustrated optical fibers 48, 50 include buffer layers 58, 60, buffer layers are not required for the optical fibers illustrated in this specification.

EXAMPLE 1

A cable 30 as shown in FIG. 2 has a diameter in the range of 2.8-3.2 mm, a slot 72 having a dimension 56 in the range of 1.2-1.8 mm, and two electrical conductors in the range of 24 to 28 AWG (American wire gauge). The electrical conductors 40, 42 are located on opposite sides of the slot 72, and their centerlines are spaced from one another a distance in the range of 1.2 to 1.75 mm. The cable jacket 102 is comprised primarily of thermoplastic urethane (TPU), thermoplastic elastomer (TPE), or polyvinylchloride (PVC).

Figure 3:
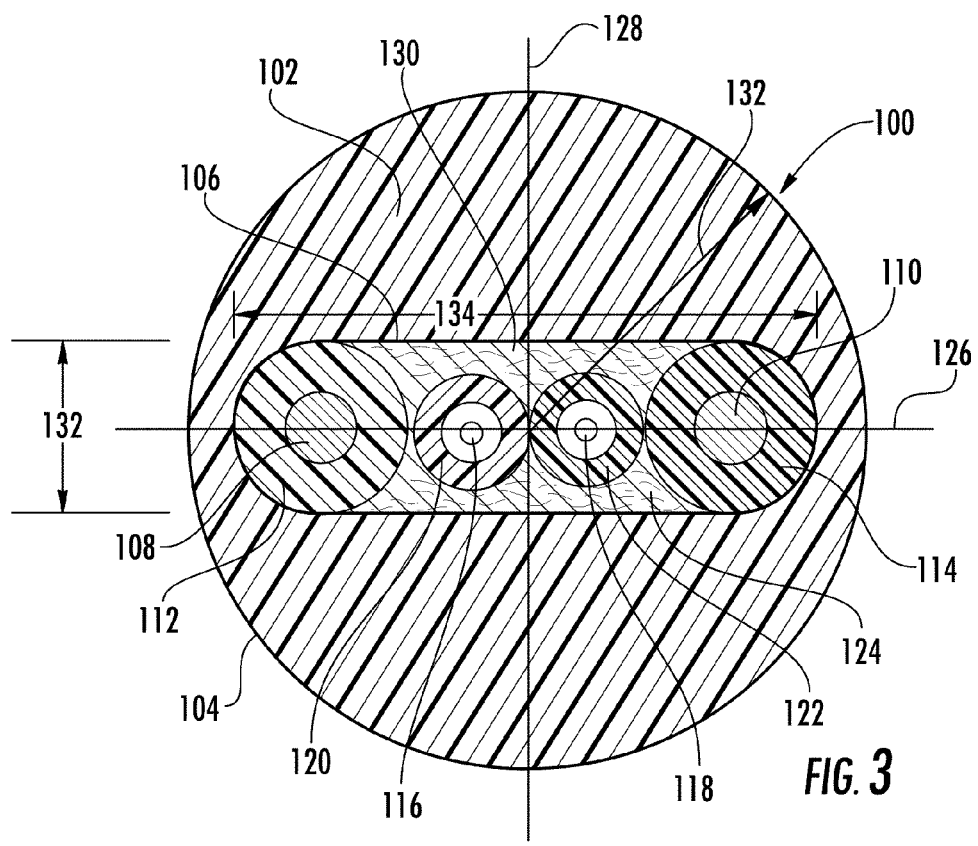
FIG. 3 is a transverse cross-sectional view of a fiber optic cable according to another embodiment of this disclosure.

FIG. 3 is a schematic cross-sectional view of a fiber optic cable 100 according to another embodiment of this disclosure. The cable 100 includes a polymer jacket 102 having an outer periphery 104 and a channel periphery 106 with the channel periphery 106 defining a channel 124. A cross-section of the illustrated cable 100 is generally circular and has a diameter of less than about 3.0 millimeters (mm). The jacket 102 surrounds the channel 124 and the channel 124 may extend the entire length of the cable 100. The cable 100 further includes a plurality of electrical conductors 108, 110 that may supply power to peripheral equipment. The electrical conductors 108, 110 are each surrounded by an insulating material 112, 114 respectively, although the insulating material may be omitted in some embodiments. For example, the conductors 108, 110 can be wholly or partially embedded in the jacket 102 at each end of the channel 124.

Data-carrying buffered optical fibers 116, 118 are also included within the cable 100, disposed between the electrical conductors 108, 100. The optical fibers 116, 118 are also each surrounded by buffer layers 120, 122, respectively. The electrical conductors 108, 110 and the buffered optical fibers 116, 118 are positioned within the channel 124. The optical fibers 116, 118 are generally allowed to translate within the channel 124, between the conductors 108, 110, when the cable 100 is bent. The channel 124 has the shape of a slot extending along a first axis 126, which is perpendicular to a second axis 128.

The cable 100 further includes a strength material 130, such as an aramid yarn. The strength material 130 is arranged within the channel 124. In accordance with the embodiment and as shown in FIG. 3, the strength material 130 surrounds the optical fibers 116, 118 and electrical conductors 108, 110. The strength material 130 may be generally located throughout the channel 124 and dispersed among the electrical conductors 108, 110 and the optical fibers 116, 118. The strength material 130 is loosely packed enough such that it allows the optical fibers 116, 118 to move to a limited extent within the jacket 102.

The channel or slot 124 can have a maximum height 132 and a maximum width 134. The width 134 can be, for example, at least two, or even three times the height 132. The shape of the channel 124 provides the cable 100 with a preferential bend characteristic that causes the cable 30 to bend about the axis 126 when experiencing bending stresses. The non-preferred direction of bending is about the second axis 128. According to an aspect of the present embodiment, the optical fibers 48, 50 are selected so that as cable 100 bends back on itself about axis 126, the optical fibers do not bend at a radius below their minimum bend radii. For example, the exemplary cable 100 has an outer diameter of about 3.0 mm or less (i.e. the radius 132 being 1.5 mm or less). The optical fibers 116, 118 have a minimum bend radius of about 1.2 mm. Therefore, as the cable 100 is bent back on itself about axis 126 (i.e. the preferred direction about the axis having the minimum moment of inertia), the optical fibers 116, 118 will not have a bend radius below their minimum bend radius.

Figure 4:
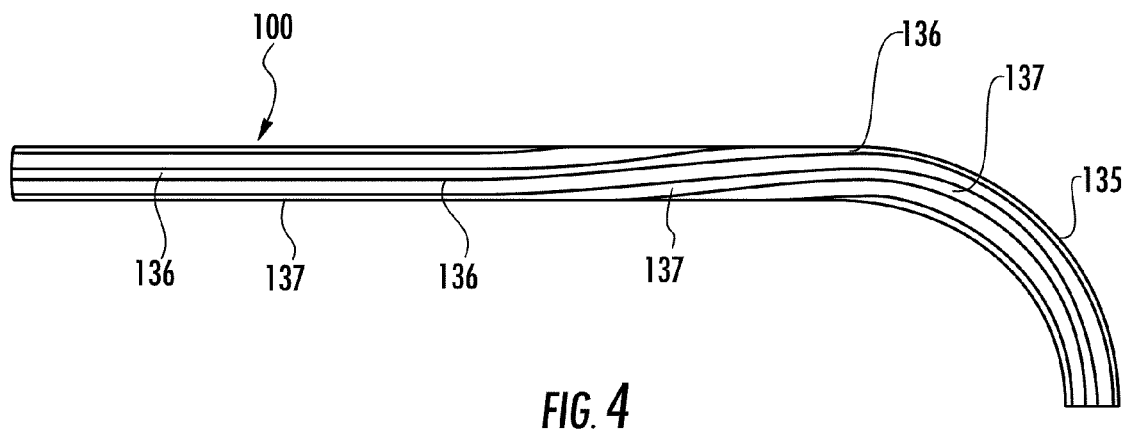
FIG. 4 is a side view of the fiber optic cable of FIG. 3 being bent about an axis having a maximum moment of inertia.

If the cable 100 is bent about axis 128 (i.e. the non-preferred direction and the axis having the maximum moment of inertia), it is possible that one of the optical fibers 116, 118 may be bent at a radius below its minimum bend radius. However, referring to FIG. 4, if a length of the cable 100 is bent about the axis having the maximum moment of inertia, the cable 100 tends to rotate about 90 degrees to align the axis having the minimum moment of inertia with the axis about which the cable 100 is bent. For example, if the length of cable 100 is bent at location 135, stripes 136, 137 on the exterior of the cable 100 are seen to rotate about 90 degrees. This corresponds to a rotation of the cross-section of the cable 100 and the axis having the minimum moment of inertia will become the axis of bending. In order for this rotation to occur, a ratio of the bend energy required to bend the cable 100 about the axis 128 having the maximum moment of inertia to the bend energy required to bend the cable 100 about the axis 126 having the minimum moment of inertia should be at least 1.5:1 and may be as large as 4:1. When the cable 100 is bent back on itself and axis 126 rotates 90 degrees, the cross-section and optical fibers 116, 118 will rotate as well and the optical fibers 116, 118 will be bent at a radius less than the minimum bend radius.

Bend energy and inertia depend on the cross-sectional geometry of the cable as well as the material properties of the individual cables (for example, the cable jacket, the electrical conductors, and the optical fibers to name but a few) and can be calculated readily. The shape of the channel 124, or optical fiber channel 124, can be determined based on the inertia and bend energy calculations to ensure the optical fibers 116, 118 are not bent at a radius less than their minimum bend radius. A geometric center of the channel 124 can correspond to a geometric center of the cable 100, which can have a round cross-section, or the geometric center of the channel 124 can be within 0.2 mm of the center of the cable 100.

EXAMPLE 2

A cable 100 as shown in FIG. 3 has a diameter in the range of 2.8-3.2 mm, a channel 124 having a height 132 in the range of 0.6-1.4 mm, a width 134 in the range of 1.5-2.8 mm, and two electrical conductors in the range of 24 to 28 AWG. The electrical conductors 40, 42 are located on opposite sides of the optical fibers 116, 118. The cable jacket 102 is comprised primarily of thermoplastic urethane (TPU), thermoplastic elastomer (TPE), or polyvinylchloride (PVC).

Figure 5:
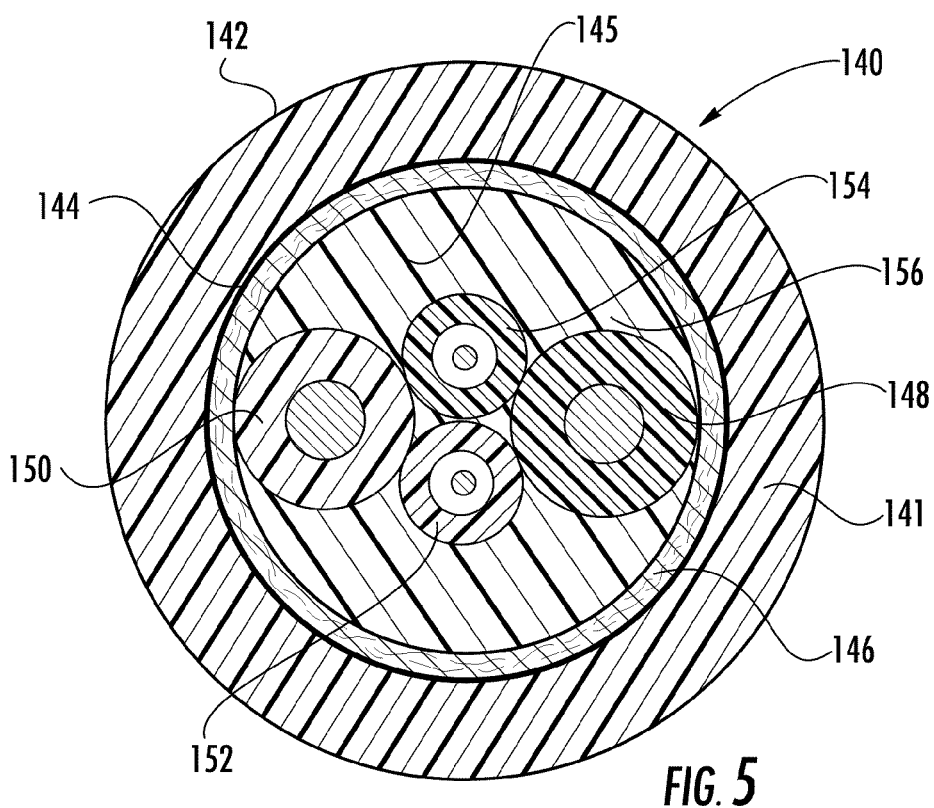
FIG. 5 is a transverse cross-sectional view of a fiber optic cable according to another embodiment of this disclosure.

FIG. 5 is a cross-sectional view of a fiber optic cable 140 according to another embodiment of this disclosure. The cable 140 includes a polymer jacket 141 having an outer periphery 142 and a channel periphery 144 that defines a channel or optical channel 145. A cross-section of the cable 140 is generally circular with a diameter of 3.0 millimeters or less, or more generally in the range of 2.8-3.2 mm. The jacket 141 surrounds the channel 145 and the channel 145 may extend the entire length of the cable 140. The cable 140 further includes a plurality of electrical conductors 148, 150 that supply power to peripheral equipment. Data-carrying buffered optical fibers 152, 154 are also included within the cable 140. The electrical conductors 148, 150 and the optical fibers 152, 154 are positioned within the channel 145. In some embodiments, the electrical conductors 152, 154 may be wholly or partially embedded within the jacket 141, between the outer periphery 142 and the channel periphery 144. The cable 140 further includes a strength material 146, such as an aramid yarn. As illustrated, the strength material 146 is arranged within the jacket 141 and adjacent to channel periphery 144. It is not required that the strength material 146 be arranged as such and may be arranged within the jacket in any convenient orientation or arrangement.

The cable 140 also includes a non-conducting elastomeric material 156 that occupies the channel 145. A conductive elastomeric material may be used if necessary to provide EMI (electromagnetic interference) shielding or for other properties. The elastomeric material 156 functions to maintain the position of the electrical conductors 148, 150 and the optical fibers 152, 152. The elastomeric material 156 may be any material such a polymer or resin that is sufficiently strong to maintain the position of the cable components (i.e. electrical conductors and optical fibers) and that is sufficiently flexible to allow the cable 140 to move through a wide range of motion. It is also desired that the elastomeric material 156 have a low coefficient of thermal expansion to minimize buckling. The elastomeric material 156 can be used to position the optical fibers 152, 154 central to the fiber optic cable 140. By doing so, the bend radius of the optical fibers 152, 154 is fixed and independent of how the cable 140 is bent.

The elastomeric material 156 can be introduced into the channel 145 by a coextrusion process as the jacket 141 is being extruded. The optical fibers 152, 154, and electrical conductors, if present in the channel 145, can essentially become embedded in the elastomeric material 156. The jacket 141 can have a modulus of elasticity in the range of 1 to 2,500 MPa. The elastomeric material 156 can have a modulus of elasticity in the range of 3,000 to 10,000 MPa.

EXAMPLE 3

A cable 140 as shown in FIG. 5 has a diameter in the range of 2.8-3.2 mm and two electrical conductors in the range of 24-28 AWG. The cable jacket 102 is comprised primarily of thermoplastic urethane (TPU), thermoplastic elastomer (TPE), or polyvinylchloride (PVC) having a modulus of elasticity of less than 2,500 MPa. The elastomeric material 156 is a thermoplastic elastomer having EMI shielding properties, and a modulus of elasticity in the range of 3,000 to 10,000 MPa that is coextruded with the jacket 141. Elastomeric material not having EMI shielding properties has a modulus of elasticity of less than 500 MPa.

Figure 6:
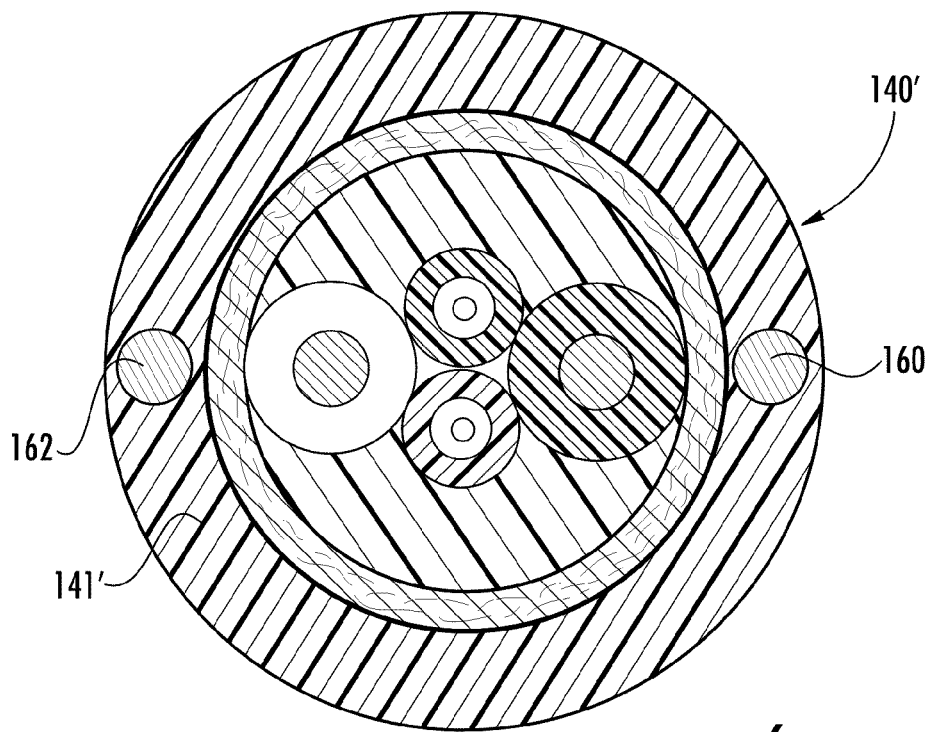
FIG. 6 is a transverse cross-sectional view of a fiber optic cable according to another embodiment of this disclosure.
Figure 7:
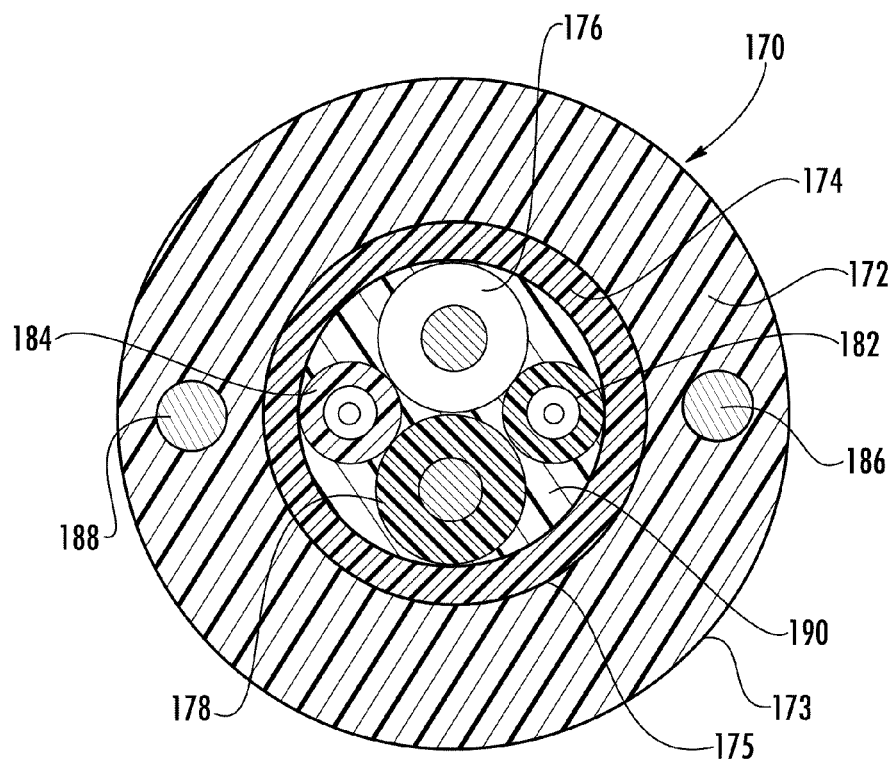
FIG. 7 is a transverse cross-sectional view of a fiber optic cable according to another embodiment of this disclosure.
Figure 8:
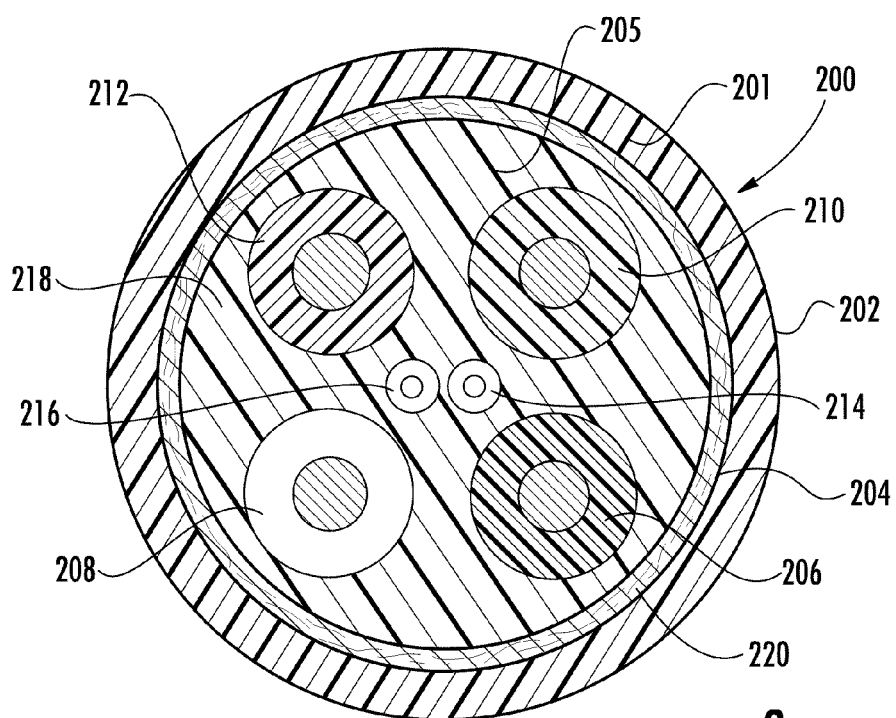
FIG. 8 is a transverse cross-sectional view of a fiber optic cable according to another embodiment of this disclosure.

FIGS. 6, 7, and 8 illustrate various embodiments based on the principles of the embodiment of FIG. 5. FIG. 6 illustrates a fiber optic cable 140' having all of the elements of the fiber optic cable 140 of FIG. 5, but includes additional data-carrying components 160, 162 arranged within the jacket 141' of the cable 140'. Such a configuration is known as a backward compatible fiber optic USB cable 140'.

FIG. 7 illustrates a fiber optic cable 170 similar to the embodiment of FIG. 6 but having a different internal arrangement of the fiber optic cable components. The fiber optic cable 170 comprises a jacket 172 having an outer periphery 173 and a channel periphery 175, the channel periphery 175 defining a channel 190. Electrical conductors 176, 178 and optical fibers 182, 184 are held in position by an elastomeric material 190. Data-carrying conductors 186, 188 may be arranged within the jacket 172. A strength material 174 is arranged adjacent the channel periphery 175. In this embodiment, the optical fibers 182, 184 and the electrical conductors 176, 178 are arranged central to the cable 170 to produce a smaller optical fiber channel 175.

Similarly, FIG. 8 illustrates a fiber optic cable 200 similar to the embodiment of FIG. 7 but having a different internal arrangement of the fiber optic cable components. The fiber optic cable 200 comprises a jacket 201 having an outer periphery 202 and a channel periphery 204, the channel periphery 204 defining a channel 205. Electrical conductors 206, 208, data-carrying conductors 210, 212, and optical fibers 214, 216 and are held in position by an elastomeric material 218. A strength material 220 is arranged adjacent the channel periphery 204. In this embodiment, the optical fibers 214, 216 are arranged proximate a center of the cable 200 and the electrical conductors 206, 208 and the data-carrying conductors 210, 212 surround the optical fibers 214, 216 to produce a larger optical fiber channel 204.

Throughout the foregoing disclosure, the adjective "about" has been used in numerous locations preceding an amount. Other embodiments of this disclosure are like the above-discussed embodiments, except that the adjective "about" is optional and may be omitted. It will be understood to the skilled artisan that the methods disclosed herein to control optical fiber position within a fiber optic cable are not mutually exclusive and may be used in any combination as required to achieve appropriate control of optical fiber position.

We claim:

1. A fiber optic cable comprising:
   a polymer jacket having a channel therein, the channel having a first slot;
   at least one optical fiber in the first slot;
   a first electrical conductor; and
   a second electrical conductor,
   wherein the optical fiber is positioned in the first slot and remains within the first slot when the fiber optic cable is bent a maximum amount such that a bend radius of the optical fiber is greater than or equal to a minimum bend radius of the optical fiber;
   wherein the cable has a diameter in the range of 2.8-3.2 millimeters;
   wherein the first slot is arranged on a first axis, and a second axis extends through the first and second electrical conductors; and
   wherein the cable has a preferential bend axis of minimum bend moment of inertia about the second axis.

2. The fiber optic cable of claim 1, wherein the first slot has a height in the range of 1.2-1.8 millimeters.

3. The fiber optic cable of claim 1, wherein the first electrical conductor is located on a first side of the first slot and the second electrical conductor is located on an opposite side of the first slot.

4. The fiber optic cable of claim 3, wherein the first and second electrical conductors are located in a second slot aligned with the second axis and intersecting the first slot, the first and second slots being defined in part by four projections of the cable jacket extending inwardly toward a geometric center of the cable.

5. The fiber optic cable of claim 3, wherein the first and second electrical conductors are embedded in the polymer jacket.

6. The fiber optic cable of claim 3, wherein the first electrical conductor has a first centerline and the second electrical conductor has a second centerline, a spacing between the first and second centerlines being in the range of 1.2-1.75 millimeters.

7. A fiber optic cable comprising:
   a polymer jacket having a channel therein, the channel having a first slot;
   at least one optical fiber in the first slot;
   a first electrical conductor; and
   a second electrical conductor, wherein the first and second electrical conductors are wholly embedded in the polymer jacket,
   wherein the optical fiber is positioned in the first slot and remains within the first slot when the fiber optic cable is bent a maximum amount such that a bend radius of the optical fiber is greater than or equal to a minimum bend radius of the optical fiber; and
   wherein the first slot is arranged on a first axis, and a second axis extends through the first and second electrical conductors, wherein the second axis is perpendicular to the first axis, and wherein the cable has a preferential bend axis of minimum bend moment of inertia about the second axis.

8. The fiber optic cable of claim 7, wherein the first and second conductors are embedded in the jacket on opposite sides of the first slot.

9. The fiber optic cable of claim 7, wherein the jacket is comprised primarily of thermoplastic elastomer.

10. The fiber optic cable of claim 7, wherein the cable has an outer diameter in the range of 2.8-3.2 millimeters.

11. The fiber optic cable of claim 7, further comprising strength material arranged in the channel and contacting the at least one optical fiber, wherein the strength material comprises a yarn.

12. The fiber optic cable of claim 7, wherein the first slot is arranged on a first axis, and a second axis extends through the first and second electrical conductors, wherein the second axis is perpendicular to the first axis, and wherein the cable has a preferential bend axis of minimum bend moment of inertia about the second axis.

13. A fiber optic cable, comprising:
   a polymer jacket having a channel therein, the channel having a first slot;
   at least one optical fiber in the first slot;
   a first electrical conductor; and
   a second electrical conductor, wherein the first slot is arranged on a first axis, and a second axis extends through the first and second electrical conductors, wherein the second axis is perpendicular to the first axis, and wherein the cable has a preferential bend axis of minimum bend moment of inertia about the second axis;
   wherein the optical fiber is positioned in the first slot and remains within the first slot when the fiber optic cable is bent a maximum amount such that a bend radius of the optical fiber is greater than or equal to a minimum bend radius of the optical fiber.

14. The fiber optic cable of claim 13, wherein the fiber optic cable has a bend preference such that a ratio of the bend energy required to bend the cable about an axis having the maximum moment of inertia to the bend energy required to bend the cable about the axis having the minimum moment of inertia is at least 1.5:1.

15. The fiber optic cable of claim 13, wherein the fiber optic cable has a bend preference such that a ratio of the bend energy required to bend the cable about an axis having the maximum moment of inertia to the bend energy required to bend the cable about the axis having the minimum moment of inertia is 4:1 or less.

16. The fiber optic cable of claim 13, wherein the fiber optic cable has a bend preference such that a ratio of the bend energy required to bend the cable about an axis having the maximum moment of inertia to the bend energy required to bend the cable about the axis having the minimum moment of inertia is at least 1.5:1 and is 4:1 or less.

17. The fiber optic cable of claim 16, wherein when the fiber optic cable is bent back on itself about the axis of maximum moment of inertia, the fiber optic cable rotates about a cross-sectional plane such that first axis rotates 90 degrees.

18. The fiber optic cable of claim 16, wherein the shape of the channel minimizes the material moments of inertia about the second axis.

19. The fiber optic cable of claim 16, wherein the shape of the channel induces the cable to bend about the second axis when the cable is subjected to bending moments.

20. The fiber optic cable of claim 16, wherein the location of the first and second electrical conductors contributes to a preferential bend characteristic of the fiber optic cable, wherein the first and second conductors are wholly embedded in the jacket on opposite sides of the first slot, and wherein the first electrical conductor has a first centerline and the second electrical conductor has a second centerline, a spacing between the first and second centerlines being in the range of 1.2-1.75 millimeters.

* * * * *